Patented May 2, 1944

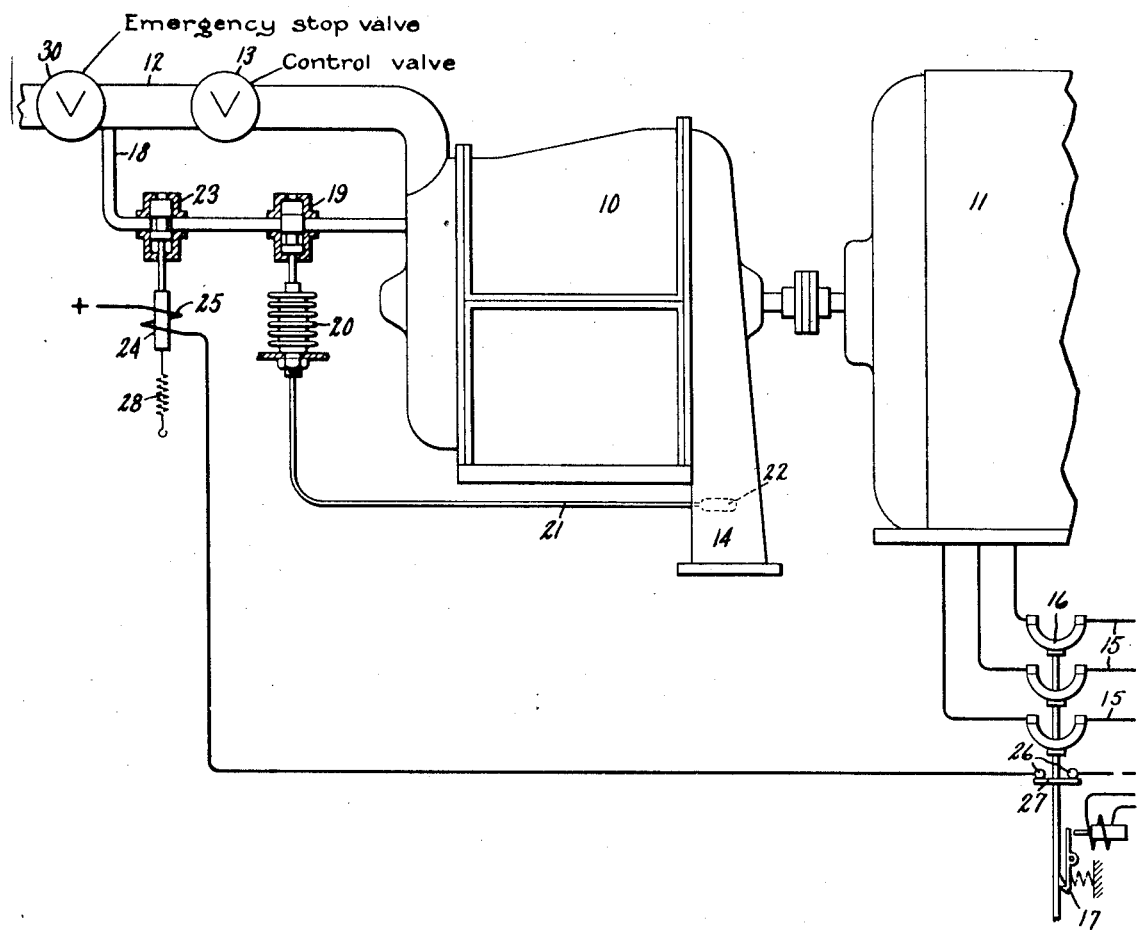

2,348,042

UNITED STATES PATENT OFFICE 2,348,042

ELASTIC FLUID TURBINE ARRANGEMENT

Glenn B. Warren, Niskayuna, N. Y., assignor to General Electric Company, a corporation of New York Application March 29, 1943, Serial No. 480,969

5 Claims. (Cl. 175—294)

The present invention relates to elastic fluid turbine arrangements including valve means for controlling the flow of elastic fluid to a turbine and means for by-passing elastic fluid relative to said valve means in order to keep the temperature within the low pressure stages in the exhaust of the turbine within safe value and to permit quick loading of the turbine. The invention is particularly important in connection with turbo generators including a synchronous generator operated at times as a rotary condenser. It is at present the generally accepted practice whenever possible to keep the exhaust temperature in turbines below 175° F. and in case such temperature is reached to reduce it to saturation temperature by the imposition of load on the turbine up to about one-fifth of the turbine rating. High exhaust temperatures in turbines are harmful because of the non-uniform heating and cooling of large parts caused at such high temperatures with resultant distortions and vibrations of turbine parts.

The general object of my invention is to provide an improved elastic fluid turbine arrangement whereby the bypassing of elastic fluid to a turbine relative to the normal control valve means is automatically controlled to maintain the exhaust temperature within safe limits.

For a consideration of what I believe to be novel and my invention, attention is directed to the following description and the claims appended thereto in connection with the accompanying drawing.

The single figure of the drawing illustrates a turbine arrangement embodying my invention.

The arrangement comprises an elastic fluid turbine 10 arranged to drive an electric generator or machine 11. The turbine has an inlet conduit 12 with valve means such as a throttle valve 13 for controlling the flow of elastic fluid to the turbine. Upon passage through the turbine stage or stages the elastic fluid is discharged through an exhaust casing or conduit 14. The electric generator 11 is connected to a power line 15 by means of a circuit breaker 16 normally held in closed position by any suitable mechanism such as a relay-operated latch 17.

Excessive heating of the turbine 10 may be caused if upon closing of the inlet valve or valve means 13 the turbine is rotated by the electric machine 11 then operating as a motor. Excessive heating of the turbine might also be effected during low load operation as when the generator 11 is operated as a synchronous condenser. In order to avoid such excessive temperatures in the turbine a bypass 18 is connected ahead and behind the valve means 13 for conducting elastic fluid to the turbine 10 upon closing of the valve means 13. The bypass arrangement according to my invention includes a valve 19 and means indicative of temperature changes in the exhaust conduit 14 for positioning the valve 19. This means in the present instance is in the form of a temperature responsive device including a bellows 20 having a movable end portion connected to the valve 19 and a fixed end portion connected by a pipe 21 to a sealed vessel 22 located in the exhaust conduit 14 and containing a fluid which expands upon temperature increase in the conduit 14. During operation an increase in temperature in the conduit 14 causes expansion of the bellows 20 whereby the valve 19 is moved towards opening position to admit or to increase the flow of fluid through the bypass 18 to the turbine 10. Vice versa, upon a decrease in temperature in the exhaust conduit 14 the bellows 20 collapses to close the valve 19, thus reducing the flow of fluid through the bypass 18. The valve 19 and the bellows 20 are preferably adjusted so that the valve 19 will begin to open only as the exhaust temperature rises beyond a predetermined value. Thus the valved bypass conduit 18, 19 and the temperature responsive device 20, 22 constitute means for bypassing and automatically controlling the bypassing of elastic fluid relative to the normal control valve means 13 of a turbine normally to maintain the exhaust temperature in the turbine at a predetermined safe value.

The bypassing of elastic fluid to a turbine for the purpose of cooling the turbine and keeping the exhaust temperature at a certain value may endanger the turbine in case of a sudden loss of load. For instance, in the example described above, the turbine might assume excessive speed if for some reason the circuit breaker 16 should open and thus disconnect the generator 11 from the line 15. In order to overcome the danger of excessive turbine speed due to elastic fluid bypassed to the turbine I provide means whereby the bypassing of fluid to the turbine is automatically interrupted in case of sudden loss of load on the turbine. This means in the present example comprises a second valve 23 in the bypass 18 which normally is held in open position by means of an electric relay 24 with an operating coil 25 connected to a source of electric energy by means of a circuit including contacts 26 and a contact-making member 27 secured to the circuit breaker 16 and bridging the contacts 26 in closed position of the circuit breaker 16. Thus, as long as the circuit breaker 16 is closed, the operating coil 25 of the relay 24 is energized to hold the valve 23 in opening position. Upon opening of the circuit breaker 16 the contacts 26 are opened, causing deenergization of the relay 24 and opening of the valve 23 by action of a biasing spring 29 forcing the valve 23 towards closing position. Subsequent closing of the circuit breaker 16 causes opening of the valve 23 by action of the relay 24 against the biasing force of the spring 29.

Ordinarily elastic fluid turbines in addition to the control valve include an emergency valve operated by an emergency speed governor to shut down the turbine during emergency conditions such as a predetermined increase in speed. In the present example I have indicated an emergency valve 30 in the inlet conduit to the turbine provided ahead of the connection of this conduit with the bypass 18. Closing of the emergency valve such as by action of an emergency speed governor (not shown) interrupts the flow of fluid through both the inlet conduit 12 with the control valve 13 and through the bypass 18 with the valves 19 and 23. With regard to the interruption of flow through the bypass 18 the emergency valve 30 constitutes an additional safety means to interrupt the bypassing of fluid upon failure of the generator 11.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. Elastic fluid turbine arrangement including a turbine having inlet valve means for controlling the flow of elastic fluid to the turbine, a bypass with a valve for bypassing elastic fluid relative to the inlet valve means, and a temperature responsive device for controlling the bypass valve in response to temperature changes in the exhaust of the turbine.

2. Elastic fluid turbine arrangement including a turbine having inlet valve means for controlling the flow of elastic fluid to the turbine, a bypass with a valve connected ahead and behind the inlet valve means for bypassing elastic fluid relative to the inlet valve means, means indicative of temperature changes in the turbine for controlling the bypass valve, another valve in the bypass, means biasing the other valve towards closing position, and other means indicative of load on the turbine for normally holding the valve in open position.

3. Turbo generator including an elastic fluid turbine having an inlet valve for controlling the flow of elastic fluid to the turbine, a conduit for bypassing elastic fluid relative to the inlet valve, an electric generator driven by the turbine, a circuit breaker for connecting the generator to a line, and means including a valve in the bypass for automatically interrupting the bypassing of fluid upon opening of the circuit breaker.

4. Turbo generator including a turbine having an inlet valve for controlling the flow of elastic fluid to the turbine, a bypass connected ahead and behind the inlet valve for bypassing elastic fluid to the turbine, means for controlling the bypassing of fluid including a first valve in the bypass, a device indicative of temperature changes in the turbine for positioning the first valve, a generator driven by the turbine, a circuit breaker for connecting the generator to a line, a spring-biased second valve in the bypass, and means responsive to the circuit breaker position for holding the second valve in open position when the circuit breaker is closed.

5. Elastic fluid turbine arrangement including a turbine having an inlet conduit with a control valve and an emergency valve provided ahead of the control valve as regards the flow of fluid through the inlet conduit, a bypass with a valve having an inlet connected to the inlet conduit at a point between the emergency valve and the control valve and an outlet connected behind the control valve as regards the flow of fluid therethrough, and means for controlling the bypass valve including a device responsive to temperature changes in the turbine exhaust.

GLENN B. WARREN.